United States Patent
Boggio

(10) Patent No.: US 10,324,004 B2
(45) Date of Patent: Jun. 18, 2019

(54) METHODS AND DEVICES FOR ADAPTIVE AUTONOMOUS POLYNOMIAL INTERPOLATION OF TIME SERIES DATA

(71) Applicant: The Boeing Company, Chicago, IL (US)

(72) Inventor: John M. Boggio, Hazelwood, MO (US)

(73) Assignee: The Boeing Company, Chicago, IL (US)

( * ) Notice: Subject to any disclaimer, the term of this patent is extended or adjusted under 35 U.S.C. 154(b) by 371 days.

(21) Appl. No.: 14/687,854

(22) Filed: Apr. 15, 2015

(65) Prior Publication Data

US 2016/0305848 A1    Oct. 20, 2016

(51) Int. Cl.
| | | |
|---|---|---|
| *G05B 23/02* | (2006.01) | |
| *G05B 23/00* | (2006.01) | |
| *G01M 17/007* | (2006.01) | |
| *G06Q 10/06* | (2012.01) | |
| *G06Q 10/00* | (2012.01) | |
| G05B 19/418 | (2006.01) | |

(52) U.S. Cl.
CPC ...... *G01M 17/007* (2013.01); *G06Q 10/0631* (2013.01); *G06Q 10/20* (2013.01); *G05B 19/4184* (2013.01); *G05B 23/00* (2013.01); *G05B 23/02* (2013.01); *G05B 23/0283* (2013.01); *G05B 2219/24001* (2013.01); *G05B 2219/37542* (2013.01)

(58) Field of Classification Search
CPC ............ G01M 17/007; G06Q 10/0631; G06Q 10/20
USPC .......................................... 702/184
See application file for complete search history.

(56) References Cited

U.S. PATENT DOCUMENTS 5,796,922 A * 8/1998 Smith ............... G05B 13/0265
                                                    700/252
6,643,610 B1 * 11/2003 Kleven ..................... G01F 1/42
                                                    702/138

(Continued)

OTHER PUBLICATIONS

Sanyasiraju et al., "Newton's Divided Difference Formula," Indian Institute of Technology Madras, 6 pages, accessed Apr. 14, 2015, https://mat.iitm.ac.in/home/sryedida/public_html/caimna/interpolation/nddf.html.

(Continued)

*Primary Examiner* — Ly D Pham
(74) *Attorney, Agent, or Firm* — Yee & Associates, P.C.

(57) ABSTRACT

A method of performing maintenance. Data is received from a plurality of physical sensors that measure parameters of parts of the platform, wherein a data point is missing from the data. A plurality of different polynomial interpolation values is calculated for the missing data point using a plurality of different polynomial interpolation formulas. A relative strength for each of the plurality of different polynomial interpolation values is calculated, wherein relative strengths are determined. A best polynomial interpolation value is selected based on a highest strength of the relative strengths. The best polynomial interpolation value is substituted for the data point that is missing from the data, wherein filled data is created. A status of the parts is determined based on the filled data, wherein an analysis is formed. Responsive to the analysis indicating that maintenance is due for a part in the parts, causing maintenance to be performed.

41 Claims, 8 Drawing Sheets

| | COLUMN A 102 | COLUMN B 104 | COLUMN C 106 | COLUMN D 108 | COLUMN E 110 |
|---|---|---|---|---|---|
| | DATA SEQUENCE | TRIM AIR VALVE 1 | TRIM AIR VALVE 2 | TRIM AIR VALVE 3 | TRIM AIR VALVE 4 |
| | 84000 | 0.17 | 114 | 116 | 118 |
| | 85000 | 122 112 | 0.05 120 | | |
| | 86000 | | | 0.48 | |
| | 87000 | | | | 0.31 |
| | 88000 | 0.22 | | | |
| | 89000 | | 0.12 | | |
| | 90000 | | | 0.37 | |
| | 91000 | | | | 0.27 |
| | 92000 | 0.25 | | | |

100

(56) References Cited

U.S. PATENT DOCUMENTS

| | | | | |
|---|---|---|---|---|
| 6,895,499 | B1* | 5/2005 | Frazier | G06F 9/4411 709/221 |
| 7,783,448 | B2* | 8/2010 | Hutchinson | G01L 27/002 702/138 |
| 8,437,875 | B2* | 5/2013 | Hernandez | G05D 1/0217 134/172 |
| 2003/0095038 | A1 | 5/2003 | Dix | |
| 2003/0179175 | A1* | 9/2003 | Shigeta | G09G 3/3648 345/101 |
| 2003/0184399 | A1* | 10/2003 | Lanoue | H03L 1/022 331/176 |
| 2005/0010377 | A1* | 1/2005 | Stake | G05B 19/4183 702/188 |
| 2006/0039471 | A1* | 2/2006 | Dane | H04N 19/172 375/240.16 |
| 2006/0150657 | A1* | 7/2006 | Spurgeon | B60H 1/00378 62/331 |
| 2007/0013953 | A1* | 1/2007 | Yamamoto | H04N 1/41 358/3.13 |
| 2007/0144726 | A1* | 6/2007 | Scherer | B64D 13/00 165/203 |
| 2009/0083291 | A1* | 3/2009 | Allen | G06T 5/005 |
| 2009/0281395 | A1* | 11/2009 | Semler | A61B 5/036 600/301 |
| 2010/0114371 | A1* | 5/2010 | Tsusaka | B25J 9/0003 700/250 |
| 2010/0152894 | A1* | 6/2010 | Ha | B25J 9/08 700/245 |
| 2011/0087387 | A1 | 4/2011 | Safa-Bakhsh et al. | |
| 2012/0221585 | A1* | 8/2012 | Williamson | G06F 17/30569 707/756 |
| 2013/0187007 | A1* | 7/2013 | Mackin | F02C 6/08 244/134 R |
| 2013/0289766 | A1 | 10/2013 | Hafenrichter et al. | |
| 2013/0295831 | A1* | 11/2013 | Kelnhofer | B64D 13/06 454/76 |
| 2013/0325259 | A1* | 12/2013 | Kwon | B60H 1/00642 701/36 |
| 2014/0059518 | A1* | 2/2014 | Sierk | G06F 8/34 717/107 |
| 2014/0072013 | A1* | 3/2014 | Ruknudeen | G01K 7/01 374/178 |
| 2014/0162542 | A1* | 6/2014 | Huart | B64D 13/02 454/74 |
| 2015/0021006 | A1* | 1/2015 | Vue | F24F 13/04 165/263 |
| 2015/0088783 | A1* | 3/2015 | Mun | G06Q 10/04 705/36 R |
| 2015/0330310 | A1* | 11/2015 | deGaribody | G01S 17/58 701/100 |
| 2016/0080107 | A1* | 3/2016 | Girouard | A61B 5/0004 600/546 |
| 2016/0144983 | A1* | 5/2016 | Thuong | G01M 17/00 701/31.7 |
| 2016/0320470 | A1* | 11/2016 | Othily | G01S 5/0289 |
| 2017/0052072 | A1* | 2/2017 | Beaven | G05B 23/0235 |

OTHER PUBLICATIONS

"Newton polynomial," Wikipedia, the free encyclopedia, dated Mar. 1, 2015, 6 pages, accessed Apr. 14, 2015, http://en.wikipedia.org/wiki/Newton_polynomial.

Extended European Search Report, dated Aug. 18, 2016, regarding Application No. 16156478.6, 11 pages.

Luxhoj et al., "Trends and Perspectives in Industrial Maintenance Management", Journal of Manufacturing Systems, Society of Manufacturing Engineers, Dearborn Mi, US. vol. 16, No. 6, Jan. 1, 1997, pp. 437-453.

Ciampi et al., "Integrating Trend Clusters for Spatio-temporal Interpolation of Missing Sensor Data", Apr. 12, 2012, Web and Wireless Geographical Information Systems, Springer Berlin Heidelberg, Berlin, pp. 203-220.

European Patent Office Communication Report, dated Sep. 26, 2018, regarding Application No. 16156478.6, 10 pages.

* cited by examiner

| COLUMN A 102 | COLUMN B 104 | COLUMN C 106 | COLUMN D 108 | COLUMN E 110 |
|---|---|---|---|---|
| DATA SEQUENCE | TRIM AIR VALVE 1 | TRIM AIR VALVE 2 | TRIM AIR VALVE 3 | TRIM AIR VALVE 4 |
| 84000 | 0.17 ←112 | 114 | 116 | 118 |
| 85000 | 122 | 0.05 ↘120 | | |
| 86000 | | | 0.48 | |
| 87000 | | | | 0.31 |
| 88000 | 0.22 | | | |
| 89000 | | 0.12 | | |
| 90000 | | | 0.37 | |
| 91000 | | | | 0.27 |
| 92000 | 0.25 | | | |

FIG. 1

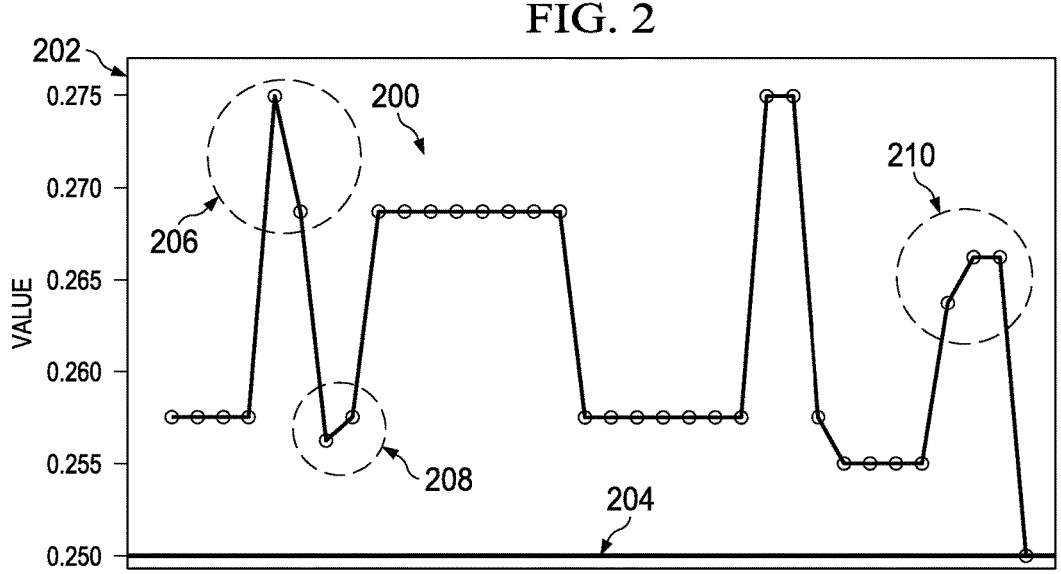
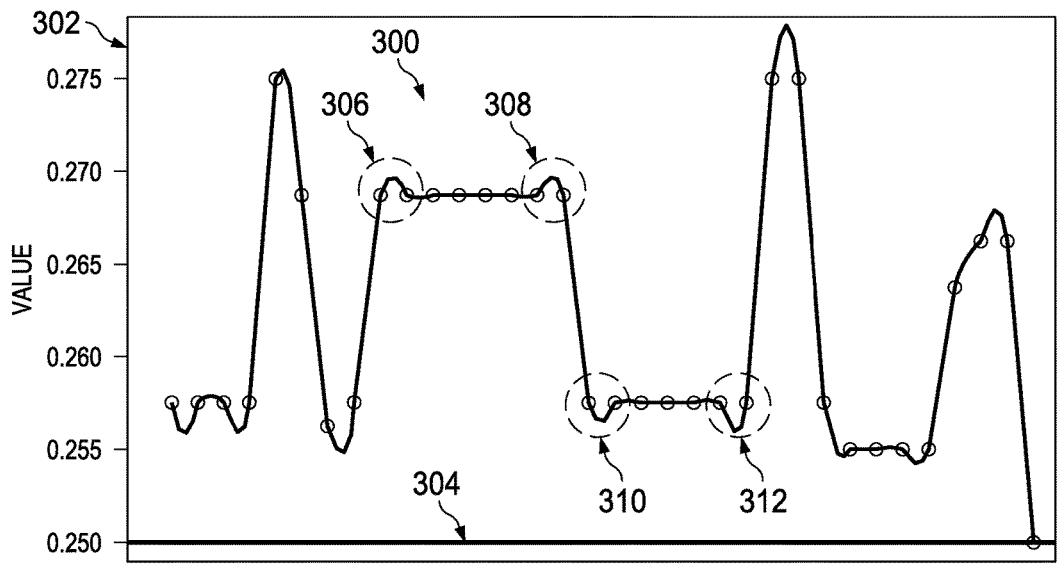

METHODS AND DEVICES FOR ADAPTIVE AUTONOMOUS POLYNOMIAL INTERPOLATION OF TIME SERIES DATA

BACKGROUND INFORMATION

1. Field

The present disclosure relates to methods and devices for performing maintenance on objects, including vehicles and buildings, especially aircraft.

2. Background

Platforms, including modern buildings and vehicles, may have several sensors used to measure various physical parameters of parts of the platform. In the case of aircraft, numerous sensors may be present to measure a wide variety of physical characteristics of various parts of the aircraft. The resulting sensor data may be used in performing maintenance on the platform.

For example, temperature sensors may be spread throughout an interior of an aircraft. These temperature sensors may be used to determine when maintenance on one or more parts of the aircraft's air conditioning system should be performed.

In most cases, these different sensors take data at different times. Thus, gaps in the data set may occur at a particular location. For example, in the temperature example above, a first temperature sensor may measure air temperature at the forward section of the aircraft at time T1 and a second temperature sensor may measure air temperature at the aft section of the aircraft at time T2. In this case, a technician may wish to guess accurately what the temperature measurement was at the second temperature sensor at time T1, or perhaps wish to guess accurately what the temperature measurement was at the first temperature sensor at time T2. As this data is often received and used after operation of the aircraft, during maintenance of the aircraft, it may be impossible to go back and obtain actual physical measurements.

A technician may wish to fill in the missing data using values that are as close to the unknown true values as possible. Additionally, when many sensors are present, a technician may face creating a vast number of missing data points. Thus, with large numbers of actual temperature measurements potentially missing, methods and devices are desired for automatically and accurately filling in any missing temperature measurements in a data set.

The above temperature example is only one narrow example of a problem in filling in missing data points. Many other examples are possible. Therefore, it would be desirable to have general methods and devices for filling in missing data points with respect to multiple sensor measurements in order to have the most accurate information possible when making platform maintenance decisions.

SUMMARY

The illustrative embodiments provide for a method for performing maintenance on a platform. The method includes receiving data from a plurality of physical sensors that measure parameters of parts of the platform, wherein a data point is missing from the data. The method further includes calculating, using a processor, a plurality of different polynomial interpolation values for the missing data point using a plurality of different polynomial interpolation formulas. The method further includes calculating, using the processor, a relative strength for each of the plurality of different polynomial interpolation values, wherein relative strengths are determined. The method further includes selecting, using the processor, a best polynomial interpolation value based on a highest strength of the relative strengths. The method further includes substituting, using the processor, the best polynomial interpolation value for the data point that is missing from the data, wherein filled data is created. The method further includes determining, using the processor, a status of the parts based on the filled data, wherein an analysis is formed. The method further includes responsive to the analysis indicating that maintenance is due for a part in the parts, causing maintenance to be performed.

The illustrative embodiments also provide for a system. The system includes a processor, a bus connected to the processor, and a memory connected to the bus. The memory stores computer usable program code for executing a method of performing maintenance on a platform. The computer usable program code includes computer usable program code for receiving data from a plurality of physical sensors that measure parameters of parts of the platform, wherein a data point is missing from the data. The computer usable program code includes computer usable program code for calculating, using a processor, a plurality of different polynomial interpolation values for the missing data point using a plurality of different polynomial interpolation formulas. The computer usable program code includes computer usable program code for calculating, using the processor, a relative strength for each of the plurality of different polynomial interpolation values, wherein relative strengths are determined. The computer usable program code includes computer usable program code for selecting, using the processor, a best polynomial interpolation value based on a highest strength of the relative strengths. The computer usable program code includes computer usable program code for substituting, using the processor, the best polynomial interpolation value for the data point that is missing from the data, wherein filled data is created. The computer usable program code includes computer usable program code for determining, using the processor, a status of the parts based on the filled data, wherein an analysis is formed. The computer usable program code includes computer usable program code for, responsive to the analysis indicating that maintenance is due for a part in the parts, ordering a robot to perform maintenance on the platform. The system further includes the robot in communication with the processor.

The illustrative embodiments also provide for a computer program product comprising a non-transitory computer readable storage medium storing computer usable program code which, when executed by a processor, performs a method. The computer usable program code includes computer usable program code for receiving data from a plurality of physical sensors that measure parameters of parts of the platform, wherein a data point is missing from the data. The computer usable program code further includes computer usable program code for calculating, using a processor, a plurality of different polynomial interpolation values for the missing data point using a plurality of different polynomial interpolation formulas. The computer usable program code further includes computer usable program code for calculating, using the processor, a relative strength for each of the plurality of different polynomial interpolation values, wherein relative strengths are determined. The computer usable program code further includes computer usable program code for selecting, using the processor, a best polynomial interpolation value based on a highest strength of the relative strengths. The computer usable program code further includes computer usable program code for substituting, using the processor, the best polynomial interpolation value for the data point that is missing from the data, wherein filled data is created. The computer usable program code further includes computer usable program code for determining, using the processor, a status of the parts based on the filled data, wherein an analysis is formed. The computer usable program code further includes computer usable program code for, responsive to the analysis indicating that maintenance is due for a part in the parts, ordering a robot to perform maintenance on the platform.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 1 is an example table of data representing positions of trim air valves taken by multiple sensors, wherein some data is missing, in accordance with an illustrative embodiment;

FIG. 2 is an example of a graph of a set of filled-in sensor data taken over time as shown in FIG. 1, wherein the graph indicates a result of using a linear interpolation method for filling in missing values in the set of sensor data, in accordance with an illustrative embodiment;

FIG. 3 is an example of a graph of a set of filled-in sensor data taken over time as shown in FIG. 1, wherein the graph indicates a result of using a fifth order interpolation method for filling in missing values in the set of sensor data, in accordance with an illustrative embodiment;

DETAILED DESCRIPTION

Figure 4:
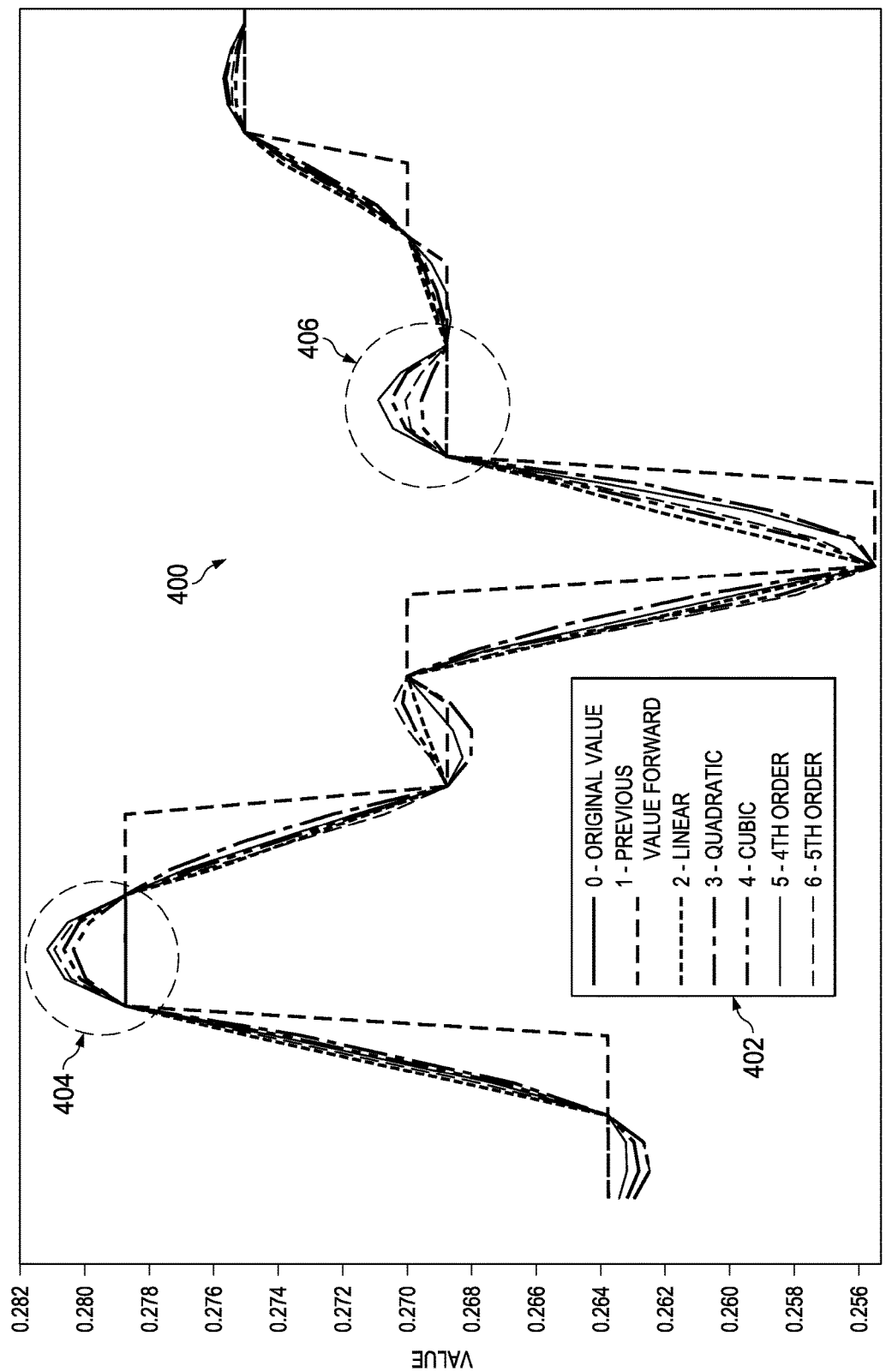
FIG. 4 is an example of seven graphs of the same set of filled-in sensor data taken over time as shown in FIG. 1, wherein five of the graphs indicate a result of using one of five different interpolation methods for filling in missing values in the set of sensor data, in accordance with an illustrative embodiment.

The illustrative embodiments recognize and take into account that often desired data values are missing from a set of sensor data. The illustrative embodiments also recognize and take into account that many different methods exist for estimating these missing data values. The illustrative embodiments also recognize and take into account that often the most accurate estimation for these missing data values is desired in order to better determine when maintenance might be desirable for a platform, such as a vehicle, building, or other platform.

The illustrative embodiments also recognize and take into account that prior methods of interpolation may use only a single method for filling missing data values from a set of sensor data. The illustrative embodiments also recognize and take into account that using a single method to fill in all values of missing data points in a set of sensor data often leads to sub-optimal estimations of corresponding true values, depending on when and how the sensor data was taken. Thus, the illustrative embodiments also recognize and take into account that improved methods for interpolating more accurate values of missing data values in a set of sensor data would be desirable. For example, more accurate interpolation of missing values in a set of sensor data would provide more accurate determinations of whether maintenance is desirable on a platform, or perhaps a type of maintenance desirable on a platform.

Applicant now describes a series of specific examples. These examples do not necessarily limit the claims or other illustrative embodiments, as described elsewhere herein, but rather is presented for illustration purposes.

One important factor for and big data solutions is accurate data. Thus, the illustrative embodiments provide methods and devices to accurately fill in missing values in time series data, which is a common problem in aircraft maintenance. The illustrative embodiments then turn this concept into a concrete physical method by performing maintenance on an aircraft accordingly.

In essence, the illustrative embodiments calculate a number of different polynomial interpolation values for individual missing values in a time series of data, compares the relative strengths of these values, then selects the best value to fill in the missing point. This procedure results in a complete data set that is highly representative of the events as they actually occurred. Increasing accuracy in the data enables more reliable predictive models and big data solutions to platform maintenance to be built.

The illustrative embodiments also solve the issue of accurately filling in missing values in time series data. During a flight, data parameters such as altitude, speed, cabin temperature, and other parameters are recorded at different intervals and sampling rates. This fact makes it impossible to compare different parameters at a given point in time. The illustrative embodiments fill in these missing values more quickly and more precisely than existing methods for interpolating such values. Also, time series flight data has a tendency to fluctuate rapidly, then remain at a constant interval for a fixed period of time, then fluctuate rapidly again. The illustrative embodiments are able to accurately capture this shift in variation, whereas current interpolation methods do not.

The most prevalent current interpolation method is to take the previous recorded value and copy it forward. While this procedure is simple and fast, the drawback to this method is that it produces inaccurate data, especially when the data has a high degree of variation. Other interpolation methods work well with highly varied data, but they are more difficult and time-intensive to calculate, and do not correctly estimate for changes in the level of variation.

Flight data is made up of different types of variables. A single interpolation method is not ideal for the different types. With thousands of flight parameters it would be very challenging to define a method for each parameter.

The illustrative embodiments will automatically adapt to any type of variation present in the time series data. This procedure allows this single interpolation method to be applied to all parameters. It also analyzes and calculates each point individually, so multiple interpolation methods can be used in a single time series. This procedure creates an accurate representation of time series data that has differing degrees of variation (fluctuate, remain constant, then fluctuate again), for which current methods do not account.

The illustrative embodiments provide for automatically selecting, at each individual missing data value, a particular interpolation method from a group of conventional interpolation methods based on the best strength for that particular point in time. One issue addressed by the illustrative embodiments is a more accurate method of interpolating missing data. Interpolating is a process of filling in missing values in a time series. Interpolation might also be described as predicting the in-between values of a set of measured data.

The illustrative embodiments have several different applications. One use for the illustrative embodiments is detecting when maintenance is desirable for parts on an airplane. In a specific illustrative embodiment, temperature readings of the left side of the airplane are compared to the right side. Sometimes the left side parameters are captured at a different time interval than the right side, such that the raw data is not directly comparable.

The illustrative embodiments may be used to analyze flight data and predict when a maintenance action is desirable. In a specific non-limiting example, the illustrative embodiments may be used to analyze flight data and predict when maintenance is desirable on the aircraft's air conditioning system. For example, the illustrative embodiments can be used to compare cabin temperatures in the different passenger zones, where the original temperature data is not gathered at the exact same time. Thus, the illustrative embodiments allow obtaining an interpolated temperature value for what the temperature might be at one point in time at one location so that interpolated value can be compared to the measured temperature value at a different portion of the cabin at that point in time.

In summary, the illustrative embodiments provide methods and devices for selecting the best polynomial value (corresponding to a best polynomial interpolation method) to get the best interpolation value for a missing data point at particular point in time. In one example, the best value is closest to the previous measured value. The illustrative embodiments find the best value by using multiple interpolation methods (and their corresponding values) at each missing data value and selects the best method (or corresponding value) to automatically and more accurately fill in missing values in the data.

Thus, the illustrative embodiments provide for improved data to better predict when maintenance is desirable because the illustrative embodiments are based on better data relative to existing methods. Better data allows for more reliable predictions. The illustrative embodiments also will automatically adapt to any type of variation present in the time series data. This feature allows the illustrative embodiments interpolation method to be applied to all parameters in a data set. The illustrative embodiments also analyze and calculate each point individually, so multiple interpolation methods can be used in a single time series. This feature results in an accurate representation of time series data that has differing degrees of variation (fluctuate, remain constant, fluctuate again), for which current methods do not account.

FIG. 1 is an example table of data representing positions of trim air valves taken by multiple sensors, wherein some data is missing, in accordance with an illustrative embodiment. The sensors may be deployed on an aircraft to measure the positions of various trim air valves within the aircraft. Trim air valves let the desired amount of warm air into the air conditioning ducts of the aircraft to achieve a desired temperature. Interpolating missing data for valve positions is a good example of the illustrative embodiments because this type of data has a tendency to vary rapidly, then remain constant for a while, then vary rapidly again. During rapid fluctuations different interpolation methods are usually desirable.

As shown in FIG. 1, a value of "1" indicates a valve is fully open. A value of "0" indicates a valve is fully closed. A value between 0 and 1 represents a percentage degree to which a valve is open.

Note that this example of data in FIG. 1 is non-limiting. The illustrative embodiments may be used with many different types of data, different platforms, and other systems as described further above and below.

In an illustrative embodiment, table 100 includes column A 102, column B 104, column C 106, column D 108, and column E 110. Note that the actual values shown in the various cells of table 100 are illustrative only and do not actually reflect real values.

Column A 102 shows a data sequence over time. The values in column A 102 may be identifiers indicating when valve position readings were taken. Column B 104 shows valve position values measured by a first sensor which measures positions of a first trim air valve. Column C 106 shows valve position values measured by a second sensor which measures positions of a second trim air valve. Column D 108 shows valve position values measured by a third sensor which measures positions of a third trim air valve. Column E 110 shows valve position values measured by a fourth sensor which measures positions of a fourth trim air valve.

As seen in FIG. 1, the valve position readings of the various sensors are taken at different times. Thus, for example, while at cell 112 an actual valve position is measured at time 84000, the other sensors did not take valve position readings at this time. Thus, the valve position values for cell 114, cell 116, and cell 118 are left blank as there is no valve position reading from these sensors at this time. Similarly, at time 85000, the second valve position sensor took a reading, as shown by the value "0.05" in cell 120; however, the values for the other cells at this time are left blank as no valve position was measured by these sensors at time 85000. As can be seen, many data values are missing in table 100 at the various other times shown in column A 102.

In an illustrative embodiment, especially when valve position values are fluctuating quickly, it may be desirable to accurately estimate what the blank values would have been had a valve position sensor taken a reading by that sensor at that time. For example, it may be desirable to quickly and accurately estimate what valve position the first sensor (column B 104) would have measured at time 85000. In other words, it may be desirable to quickly and accurately estimate what the value of cell 122 would have been had the first valve position sensor taken a reading at time 85000.

In the past, the estimated value for cell 122 would be to simply use the last value measured. Thus, for example, a guess for what the value of cell 122 would have been had a valve position been taken at that time would be the value in cell 112. In other words, the value 0.17 would be copied forward from cell 112 to cell 122. However, as described above, this method has undesirable disadvantages. The primary disadvantage is that such an estimate is usually not accurate, particularly when the valve position is fluctuating quickly.

The illustrative embodiments described below provide a more accurate and faster means for estimating the value in cell 112, as well as all of the other cells in FIG. 1 that are empty. In this manner, a more accurate estimate of valve position readings at all times may be obtained. The result is a filled-in data table which includes measured and valve position temperature values.

In turn, this filled-in data table may be used to determine when maintenance is to be performed on the air conditioning system of an aircraft. For example, if the readings vary greatly at the first trim air valve relative to expected values, then this fact may indicate that one or more parts in the air conditioning system that service the first trim air valve may require maintenance. Appropriate maintenance and inspection may then be performed, either by technicians or perhaps automatically using one or more robots.

As indicated above, the illustrative embodiments are not limited to filling in missing data from valve position sensors on an aircraft. The illustrative embodiments may be used for any data interpolation problem for sensor readings taken on any kind of platform. As used herein the term "platform" means any vehicle, building, or machine for which sensor data is taken by one or more sensors. Thus, the illustrative embodiments could be used with respect to water vessels, buildings, automobiles, tanks, manufacturing machinery, or any other object for which sensor data is taken by one or more sensors, and wherein missing data is to be interpolated or estimated in the resulting sensor data set. The illustrative embodiments are more generally applicable to many problems involving estimating missing values within a given data set.

The illustrative embodiments also have other uses with respect to aircraft maintenance. For example, the illustrative embodiments may be used to validate maintenance issues with temperature controls and heat and cooling generation by analyzing temperatures at various locations within the cabin of the aircraft at each flow schedule and flight phase. The illustrative embodiments may be used to diagnose behavior in an environmental control system (ECS) by comparing the trim air pressure to the mix manifold temperature and positions of the trim air zone modulating valves. The illustrative embodiments may be used to predict when maintenance may be desirable in the flow control valves by comparing the interaction between the upper and lower flow control valves in the bleed air system at different altitudes. The illustrative embodiments have many other applications, both on aircraft and on other platforms.

FIG. 2 through FIG. 5 are directed towards a one example of the illustrative embodiments. However, as described above, the illustrative embodiments are not limited to this example.

FIG. 2 is an example of a graph of a set of filled-in sensor data taken over time as shown in FIG. 1, wherein the graph indicates a result of using a linear interpolation method for filling in missing values in the set of sensor data, in accordance with an illustrative embodiment. Likewise, FIG. 3 is an example of a graph of a set of filled-in sensor data taken over time as shown in FIG. 1, wherein the graph indicates a result of using a fifth order interpolation method for filling in missing values in the set of sensor data, in accordance with an illustrative embodiment. FIG. 2 and FIG. 3 should be viewed together. As used herein, the term "interpolated data" refers to estimated values of missing measurements, such as estimating what the true values would be for the blank cells in FIG. 1.

Graph 200 of FIG. 2 is a graph of trim air valve position (Y-Axis 202) over time (X-Axis 204) using the data shown in FIG. 1 together with interpolated data entered into the blank cells of FIG. 1. Similarly, graph 300 of FIG. 3 is a graph of trim air valve position (Y-Axis 302) over time (X-Axis 304) using the data shown in FIG. 1 together with interpolated data entered into the blank cells of FIG. 1. The difference between graph 200 and graph 300 is that a different interpolation method was used to interpolate values for the missing data in the blank cells shown in FIG. 1.

In particular, graph 200 represents the data in FIG. 1 wherein the missing data values were interpolated using a linear interpolation method. Graph 300 represents the data in FIG. 1 wherein the missing data values were interpolated using a fifth order interpolation method. These interpolation methods, as well as the quadratic, cubic, and fourth order interpolation methods, are, taken individually, known. Thus, the linear interpolation method in graph 200 and the fifth order interpolation method in graph 300 are not presented mathematically here.

Nevertheless, briefly, the higher the order of the interpolation method, the higher the complexity of the formula used to estimate missing values from the data shown in FIG. 1. Higher order interpolation methods tend to be more accurate when the valve position is changing rapidly. Lower order interpolation methods tend to be more accurate when the valve position is remaining constant.

As can be seen, graph 200 is characterized by plateaus and sharper changes in valve position over time. Graph 300 is characterized by shorter plateaus and more rounded changes in valve position, relative to graph 200, where the rate of valve position change changes from increasing to decreasing, or vice versa.

However, neither graph 200 nor graph 300 represents a desirably accurate estimation of the true valve position variation over time. The reason neither is accurate is that individually these interpolation methods are better suited for different parts of the curves shown in graph 200 and graph 300. Thus, neither method is fully desirable. In graph 200, where the linear interpolation method was used, the valve position is too rigid around the turns where the valve position moves from increasing to decreasing and vice versa. This phenomenon can be seen at area 206, area 208, and area 210. However, in graph 300, where the fifth order method was used, the valve position is too variable on the constant values following a turn. This phenomenon can be seen at area 306, area 308, area 310, and area 312.

Thus, FIG. 2 and FIG. 3 demonstrate issues with using a single interpolation method to automatically fill in missing values in a set of time-changing data, such as that shown in FIG. 1. FIG. 4 likewise shows differences in interpolation methods.

FIG. 4 is an example of seven graphs of the same set of filled-in sensor data taken over time as shown in FIG. 1, wherein five of the graphs indicate a result of using one of five different interpolation methods for filling in missing values in the set of sensor data, in accordance with an illustrative embodiment. Graph 400 of FIG. 4 is similar to graph 200 of FIG. 2 and graph 300 of FIG. 3. However, graph 400 shows six different interpolation methods superimposed on each other. Legend 402 shows which curve corresponds to which single interpolation method was used to fill in missing data values in the data set shown in FIG. 1. In other words, any given curve shown in FIG. 4 shows valve position variation over time using the data set shown in FIG. 1, with missing data values in that data set generated using a single interpolation method. Note that because the data values shown in FIG. 1 are exemplary only, the curves shown in FIG. 4 and FIG. 5 do not necessarily match the curves shown in FIG. 2 and FIG. 3. In any case, six interpolation methods were used in this illustrative embodiment; thus, six curves are shown superimposed on each other. Each curve represents a different estimation of the actual variation of trim air valve position over time.

Figure 6:
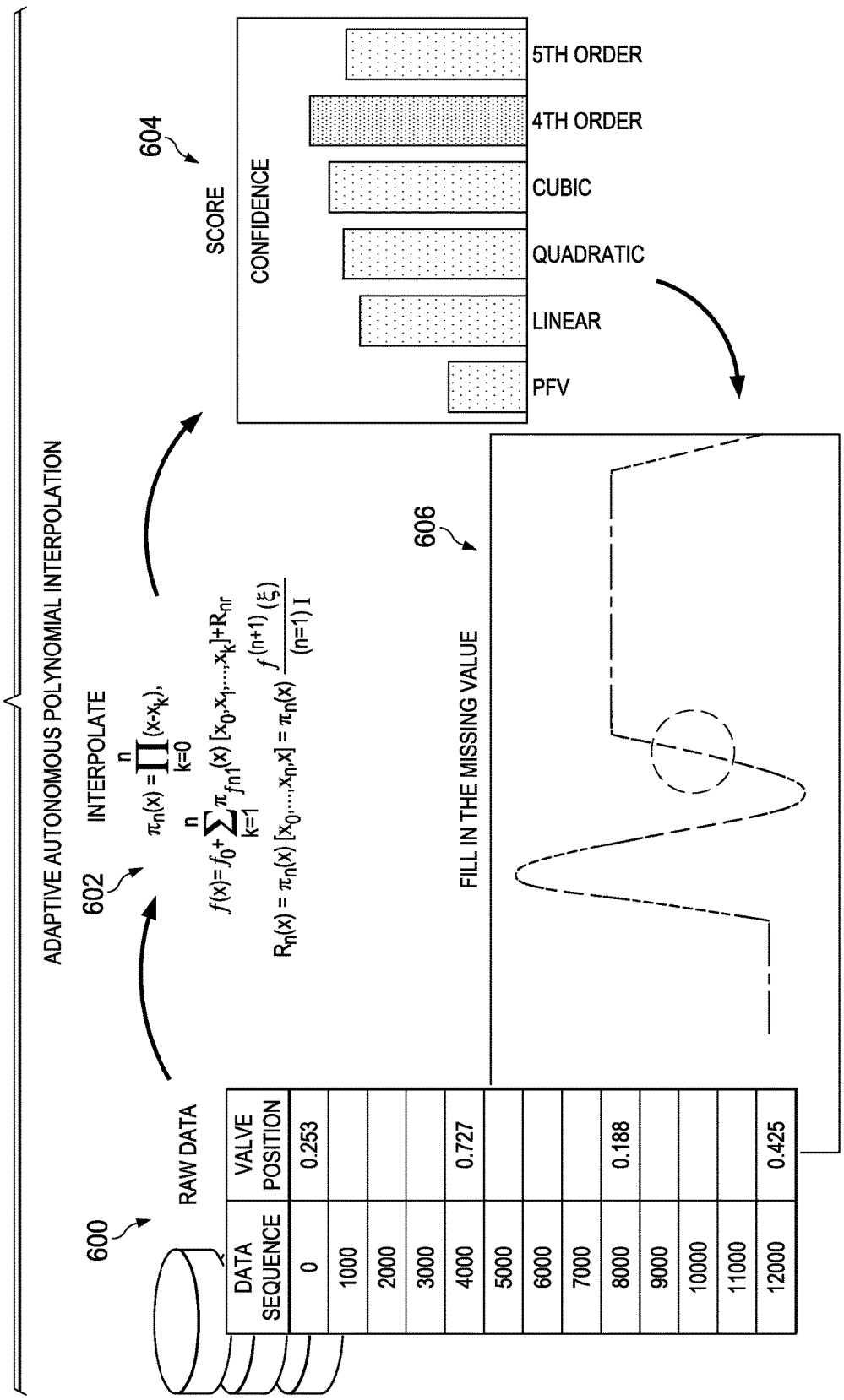
FIG. 6 is a flow of a method for performing multiple autonomous interpolation of missing values in a set of sensor data, in accordance with an illustrative embodiment.
Figure 7:
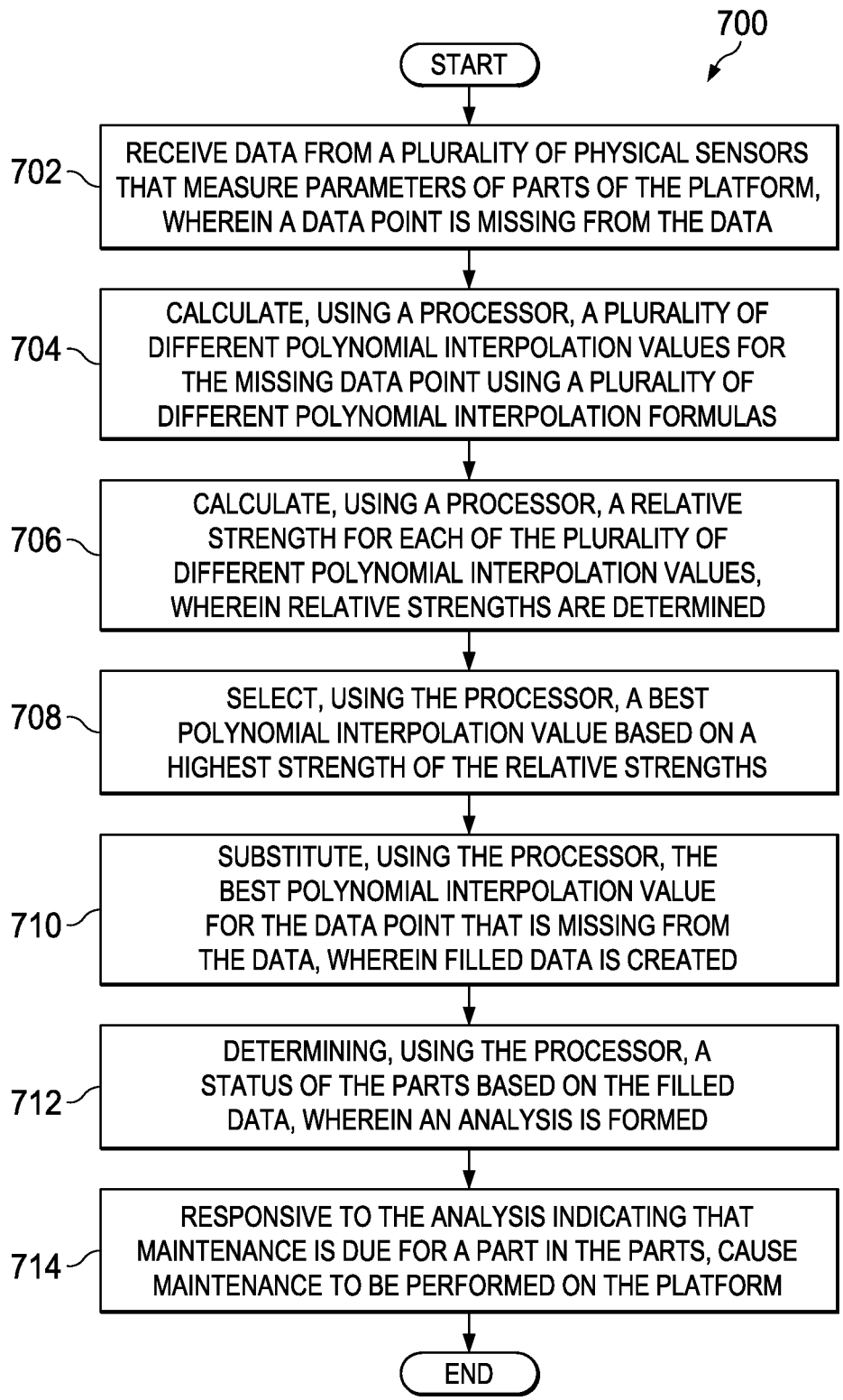
FIG. 7 is a flowchart of a method for performing maintenance on a platform, in accordance with an illustrative embodiment.

As can be seen in FIG. 4, considerable uncertainty exists in where the true valve position variation curve lies. For example, at area 404 and area 406, the six different curves show a relatively large difference between estimated temperatures at a particular point in time. The illustrative embodiments described with respect to FIG. 5 through FIG. 7 provide for methods and devices for mitigating this uncertainty and providing a more accurate estimated curve of temperature over time.

Figure 5:
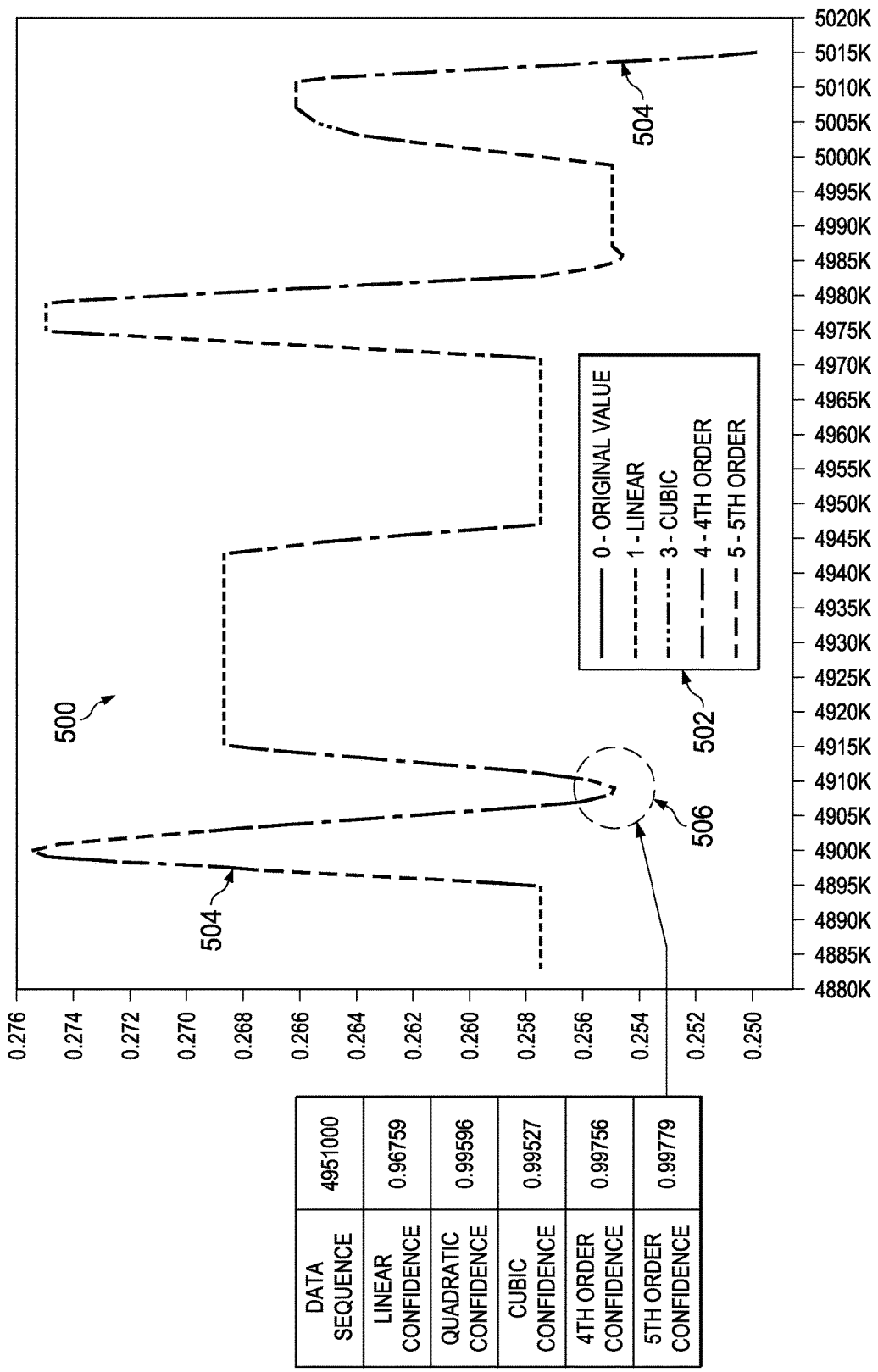
FIG. 5 is an example of a single graph of the same set of filled-in sensor data taken over time as represented in FIG. 1, but wherein multiple interpolations methods were used to autonomously fill in values missing in the set of sensor data, wherein the interpolation method changes over time, in accordance with an illustrative embodiment.

FIG. 5 is an example of a single graph of the same set of filled-in sensor data taken over time as represented in FIG. 1, but wherein multiple interpolations methods were used to autonomously fill in values missing in the set of sensor data, wherein the interpolation method changes over time, in accordance with an illustrative embodiment. Thus, while graph 500 is taken from the same data set shown in FIG. 1 relative to graphs 200, 300, and 400, graph 500 uses multiple interpolation methods over different sections of curve 504. Note that because the data values shown in FIG. 1 are exemplary only, curve 504 shown in FIG. 5 does not necessarily match the curves shown in FIG. 2 through FIG. 4. Legend 502 shows the different types of dashed lines used to represent curve 504. Each different type of dashed line in FIG. 5 represents a different interpolation method selected for a given section of curve 504.

The illustrative embodiments recognize and take into account that different interpolation methods may be more accurate at different phases of trim air valve position fluctuation. For example, while valve position is stable the linear interpolation method is more likely to estimate the true valve position values. However, the fifth order interpolation method is more likely to be accurate during sharp valve position changes.

Thus, graph 500 uses different interpolation methods to fill in the values missing from the data shown in FIG. 1, with a particular interpolation method automatically selected at a particular time. As can be seen, the resulting graph 500 shows rounder variations in curve 504 during times where valve position varies sharply, and has a plateaus that are more flat relative to any of the graphs shown in FIG. 2 through FIG. 4. These features indicate that curve 504 is a more accurate estimation of the true valve position change over time relative to any of the single methods described in FIG. 2 through FIG. 5. Thus, a visual inspection of graph 500 shows that using multiple interpolation methods to fill in missing data values at different times results in an overall more accurate valve position curve 504.

Later, with respect to FIG. 6, the method for selecting a given interpolation method at a point on curve 504 will be described. Briefly, however, at each time point multiple interpolation methods are used to estimate a missing data value. Stated differently, for each missing data value different interpolation methods are used. Of the multiple resulting proposed values to be used for that missing data value, the one that is the strongest is selected. Because different interpolation methods are better at different phases of the rate of change of valve position, different methods likely will be used at different points along curve 504. In a specific illustrative embodiment, five different interpolation methods are used for each missing data value, and the strongest of the five estimations is selected for use in curve 504.

For example, at area 506 the fifth order interpolation method had the strongest proposed value for estimating the missing data value relative to the proposed values obtained using original, linear, cubic, and fourth order interpolation methods. Thus, the fifth order interpolation method is selected within area 506 and the missing values estimated using the fifth order interpolation method are inserted in place of the missing data points at the particular points in time within area 506. Techniques for describing how to determine the relative strengths of the five proposed estimated data values are described with respect to FIG. 6.

The illustrative embodiments are not limited to five interpolation methods. More or fewer interpolation methods could be used. Different interpolation methods could be used other than those described above. Thus, the claims are not necessarily limited by the particular example given above.

FIG. 6 is a flow of a method for performing multiple autonomous interpolation of missing values in a set of sensor data, in accordance with an illustrative embodiment. The method shown in FIG. 6 may be used with respect to the data set shown in FIG. 1, but may also be used with different types of data having missing values and for different purposes. Thus, the illustrative embodiments are not necessarily limited to the illustrative embodiments shown in the method shown in FIG. 6. The method shown in FIG. 6 may be implemented using a processor, such as processor unit 904 of FIG. 9.

Initially, raw sensor data is received (operation 600). An example of this raw data is shown in FIG. 1. This raw data contains missing data values for which interpolated values are to be calculated.

Next, the missing data values are interpolated to form interpolated values (operation 602). Many different interpolation formulas may be used, such as for example the linear, quadratic, cubic, fourth order, and fifth order interpolation methods used above. Preferably, of all interpolation methods being used, all interpolation methods are used to estimate each of the missing data elements. Thus, in a simple example for illustration purposes only, if there were two missing data values and five interpolation methods being used, then five interpolated data values would be calculated for each of the two missing data values (ten interpolated values in all, five for each missing data point).

Thereafter, a confidence score is calculated for each of the interpolated values for a given missing data value (operation 604). The confidence score represents a strength of a specific interpolated value. A first interpolated value is stronger than a second interpolated value if the first interpolated value is closer to an actual sensor reading that would have been taken had that sensor taken a reading at that time. A confidence score may be assumed to be stronger if the result of the interpolated value is closer to its previous order method. For example, if a fifth order interpolation method is closest to a fourth order interpolation method (relative to, for example a fourth order interpolation as compared to a third order interpolation method), then the fifth order interpolation method is assumed to be closest what would have been the true measurement. Thus, a confidence score may be expressed as a percentage calculated by comparing one order method to a prior order method, with a result of 100% representing ideal confidence.

Because the confidence score is based on the prior interpolation method used, the confidence score formula changes for each interpolation method being used. As a non-limiting example, assume that five interpolation methods are being used for each missing data value. Assume further that the five interpolation methods being used are the linear method, the quadratic method, the cubic method, the fourth order method, and the fifth order method. In this case, the formulas for calculating the confidence score of a given interpolation value for specific missing value may be expressed as follows:

For the linear formula, $$S = 1 - \text{abs}\left(\frac{\text{Linear} - \text{Previous Value}}{\text{Linear}}\right);$$

For the quadratic formula, $$S = 1 - \text{abs}\left(\frac{\text{Quadratic} - \text{Linear}}{\text{Quadratic}}\right);$$

For the cubic formula, $$S = 1 - \text{abs}\left(\frac{\text{Cubic} - \text{Quadratic}}{\text{Cubic}}\right);$$

For the fourth order formula, $$S = 1 - \text{abs}\left(\frac{\text{4th Order} - \text{Cubic}}{\text{4th Order}}\right);$$

and
For the fifth order formula, $$S = 1 - \text{abs}\left(\frac{\text{5th Order} - \text{4th Order}}{\text{5th Order}}\right).$$

Thus, for each missing data value five interpolated values are calculated. Each of these five interpolated values is assigned a unique confidence score using the five corresponding formulas above. The selected interpolation value for that one missing data value is selected as that one which has a corresponding confidence score that is closest to 100%. This interpolation value is considered the strongest or the best, and is assumed to be the value that would have been the true value had a sensor measurement been taken at that time. This interpolated value is then filled into the missing data value (operation 606).

For the purposes of clarity another example is provided. Assume there are three missing data values in a data set. The three missing data values are labeled "A", "B", and "C". Assume five interpolation methods are being used, as expressed above. For data value A, five interpolated values are calculated, and five corresponding confidence scores are calculated. Of these five interpolated values, the one that has a confidence score closest to 100% is selected as being the strongest and that interpolated value is inserted into the missing data value "A". The same procedure explained in the last two sentences is performed for data values "B" and "C". Thus, fifteen interpolation values and fifteen corresponding confidence scores are calculated in all, but only three interpolated values are used (the ones inserted into the missing data values). The final filled-in data set has the measured data plus the interpolated values for the missing data values. This filled-in data set may then be used for further analysis, such as determining whether maintenance is desirable on a platform.

The maintenance performed on the platform may be performed by technicians or may be performed by one or more robots. The robot or robots may be controlled by the same or different processor as the processor that performed the method shown in FIG. 6. Thus, the illustrative embodiments provide for an entirely automated method of performing maintenance, including automatically determining whether maintenance is desirable and then automatically performing the maintenance. However, if desired, a human technician may interpret the data and decide whether maintenance is desirable and then another human technician may perform the maintenance. Several different types of maintenance are described above, and more are contemplated by the illustrative embodiments.

The illustrative embodiments described above may be further varied. For example, alternative methods for determining a strength of a specific interpolated value. Alternative methods for determining which specific interpolated value to select are also possible. Attention is now turned to some of these alternative method.

Some alternative methods for selecting the specific interpolated value are now discussed. In one example, regardless of what method is used for determining a strength of a specific interpolated value, one could select two or more of the strongest specific interpolated values and then average them in order to determine a new interpolated value to be used in place of the missing measurement. In another example, the strength of the interpolated values need not be determined, but rather two or more of the specific interpolated values may be averaged and that result used in place of the missing measurement. In another example, interpolated values could be averaged and then the strength of the averages used to determine which value to use in place of the missing measurement. In another example, existing measured values may be averaged, wherein the existing measured values are taken within a specified time bracket that has at least two measured values, and that average used to determine the value used in place of the missing measurement.

In yet another example, a policy could be used such as to determine if the best polynomial method is determined to be anything other than linear, then average the top two interpolated values in terms of strength. In still another example, if the strength scores of two interpolated values lie within a threshold range, then those interpolated values may be averaged; otherwise, only the strongest is used. In yet another example, a policy could be to consider only those interpolated values with strength values above a certain threshold, and then to average those values to determine what number to use in place of the missing value.

In yet another illustrative embodiment, instead of interpolating specific values for missing data points individually, groups of missing data points may be treated together. For example, each group of blank points between two measured points could be treated as a group that is interpolated using a single method. Stated differently, for all null values between two known points, use the interpolation method with the highest average confidence score for all interpolated points.

In a concrete example of the above method, consider five data points at five different times, consisting of 100, null, null, null, and 200. In this case interpolate all values and calculate confidence scores for the null values using two methods (though additional or different methods could be used). For the first null value, assume the $4^{th}$ order interpolation method yielded a value of 120 with 80% confidence and a $5^{th}$ order interpolation method yielded a value of 125 with a 95% confidence. For the second null value, assume the $4^{th}$ order interpolation method yielded a value of 150 with 90% confidence and a $5^{th}$ order interpolation method yielded a value of 155 with an 80% confidence. For the third null value, assume the $4^{th}$ order interpolation method yielded a value of 170 with 80% confidence and a $5^{th}$ order interpolation method yielded a value of 175 with a 90% confidence. Using the procedure first described with respect to FIG. 6, the first null value would use the $5^{th}$ order value, the second null value would use the $4^{th}$ order value, and the third null value would use the $5^{th}$ order value. However, if the confidence scores for all interpolated values were averaged for the three null values, the $5^{th}$ order confidence has a higher average across the three points. Thus, the value obtained using the fifth order method would instead be selected for all three null values.

In still another example for determining an interpolation value, if a relationship is known to exist between two different measured parameters, then that relationship may be used to determine the interpolated value. For example, assume that the relationship between the trim air valve positions between valve A and valve B are known to be inverses of each other. Assume that at time T a measurement for valve A is missing, but a measurement at valve B is known to be 0.25. Because the valves are known to be inverses of each other, then the interpolated value for the position of valve A may be calculated to be 0.75, as the positions are inverses of each other and are always between 0 and 1.

As shown above, many methods exist for determining an interpolated value for a missing data point. Thus, the illustrative embodiments are not necessarily limited to those initially described with respect to FIG. 6, or to the methods claimed.

Alternative methods for determining a strength of a specific interpolated value are now discussed. As first described with respect to FIG. 6, one method for determining a strength of a specific interpolated value is to compare that value to the immediately previous interpolated value obtained using a different interpolation method. Thus, for example, the values for the $4^{th}$ order and $5^{th}$ order interpolation methods may be compared to each other using the formulas provided above, and confidence scores assigned accordingly.

However, in other illustrative embodiments, the formulas may be varied. For example, different orders could be compared, such as comparing the values obtained using the $5^{th}$ order and the $3^{rd}$ order methods. In other words, compare values that are separated by two or more orders. In another example, the formulas may be varied by first calculating an average interpolated value by averaging the results of all interpolation methods, and then comparing a current interpolation order method to the average. In other words, in the equations above, the previous method's interpolated value would be replaced by the average interpolated value.

In yet another example, if a relationship is known between two different sets of measurements, then that relationship may be used to determine a confidence score for an interpolated method. For example, as described above, assume a relationship is known between trim air valve A and trim air valve B, but that relationship is not perfect. Thus, for example, their positions are inverses of each other, but not perfect inverses of each other. In this case the interpolated values may for the position of trim air valve A may be calculated using any of the methods described above. However, the confidence scores for each method are determined by comparing those interpolated values to the inverse of the measured value of trim air valve B. The interpolated value for trim air valve A that is closest to the inverse of the measured value of trim air valve B is assumed to be the strongest and thus is selected for the interpolated value of trim air valve A.

As shown above, many methods exist for determining a confidence score for an interpolated value for a missing data point. Thus, the illustrative embodiments are not necessarily limited to those initially described with respect to FIG. 6, or to the methods claimed.

FIG. 7 is a flowchart of a method for performing maintenance on a platform, in accordance with an illustrative embodiment. Method 700 is a variation of the method shown in FIG. 6. Method 700 may be used with respect to the data set shown in FIG. 1, but may also be used with different types of data having missing values and for different purposes. Thus, the illustrative embodiments are not necessarily limited to the illustrative embodiments shown in method 700. Method 700 may be executed using a processor, such as processor unit 904 of FIG. 9, using computer usable program code 918 stored in a non-transitory computer readable storage medium, such as memory 906, persistent storage 908, or associative memory 928 of FIG. 9. Thus, the various operations described in method 700 may be performed using processor unit 904 of FIG. 9 or perhaps multiple processors. One or more robots may be used in performing maintenance based on an evaluation of data having missing values that have been filled in using the illustrative embodiments described herein.

In an illustrative embodiment, method 700 is a method of performing maintenance on a platform. Data is received from a plurality of physical sensors that measure parameters of parts of the platform, wherein a data point is missing from the data (operation 702). Next, a processor may calculate a plurality of different polynomial interpolation values for the missing data point using a plurality of different polynomial interpolation formulas (operation 704). A processor may then calculate a relative strength for each of the plurality of different polynomial interpolation values, wherein relative strengths are determined (operation 706). The processor may then select a best polynomial interpolation value based on a highest strength of the relative strengths (operation 708).

Next, the processor may substitute the best polynomial interpolation value for the data point that is missing from the data, wherein filled data is created (operation 710). The processor may then determine a status of the parts based on the filled data, wherein an analysis is formed (operation 712). The process may then, responsive to the analysis indicating that maintenance is due for a part in the parts, cause maintenance to be performed on the platform (operation 714). The process may terminate thereafter.

Method 700 may have more or fewer operations. Method 700 may have different operations. Method 700 may include further details within a given operation. Thus, method 700 may be varied and does not necessarily limit the claimed inventions.

For example, with respect to method 700, calculating a relative strength comprises, for each of the plurality of different polynomial interpolation values, may include comparing a given polynomial interpolation value in the plurality of different polynomial interpolation values to a previous order of polynomial for that given polynomial interpolation value. In another illustrative embodiment, the plurality of different polynomial interpolation formulas is selected from the group consisting of: a linear method, a quadratic method, a cubic method, a fourth order method, a fifth order method, and combinations thereof. In another illustrative embodiment, the plurality of different polynomial interpolation formulas consists of all of: a linear method, a quadratic method, a cubic method, a fourth order method, and a fifth order method.

The platform of method 700 may vary. For example, the platform may be selected from the group consisting of: an aircraft, an automobile, a water vessel, a train, a machine, and a building. Other platforms are possible.

In a specific illustrative embodiment, the platform comprises an aircraft, wherein the plurality of physical sensors measure parameters of different physical areas of the aircraft, and wherein the data point that is missing corresponds to a missing measurement of a first sensor that had not taken a first reading at a point of time when a second sensor took a second reading. In this case, receiving the data may be performed during operation of the aircraft and wherein remaining steps in the method are performed after the aircraft is non-operational. Similarly, the different physical areas comprise a port side of the aircraft and a starboard side of the aircraft, and wherein the plurality of physical sensors comprises air temperature sensors.

In an illustrative embodiment, calculating the relative strength for each of the plurality of different polynomial interpolation values comprises, for a given value, using a strength formula to determine a given strength for the given value. In this particular example, the strength formula for a given value is based on 1), in a first case of a linear polynomial interpolation formula used to calculate the given value, a previous measured value for the given value or, 2) in a second case of a higher order polynomial formula used to calculate the given value, the strength formula is based on a prior value calculated using a prior polynomial interpolation formula different than a current polynomial interpolation formula used to determine the given value.

In a more specific example, the plurality of polynomial interpolation formulas consist of five formulas consisting of a linear formula, a quadratic formula, a cubic formula, a fourth order formula, and a fifth order formula, and wherein the strength formula, S, is selected from the group consisting of:

for the linear formula, $$S = 1 - \mathrm{abs}\left(\frac{\mathrm{Linear- Previous\ Value}}{\mathrm{Linear}}\right);$$

for the quadratic formula, $$S = 1 - \mathrm{abs}\left(\frac{\mathrm{Quadratic- Linear}}{\mathrm{Quadratic}}\right);$$

for the cubic formula, $$S = 1 - \mathrm{abs}\left(\frac{\mathrm{Cubic - Quadratic}}{\mathrm{Cubic}}\right);$$

for the fourth order formula, $$S = 1 - \mathrm{abs}\left(\frac{\mathrm{4th\ Order - Cubic}}{\mathrm{4th\ Order}}\right);$$

for the fifth order formula, $$S = 1 - \mathrm{abs}\left(\frac{\mathrm{5th\ Order - 4th\ Order}}{\mathrm{5th\ Order}}\right);$$

wherein five values of S are determined.

Further with respect to this example, selecting the best polynomial interpolation value based on a highest strength of the relative strengths comprises: selecting, from the five values of S, a given value that is closest to 1.

Other variations to the method are possible. For example, when filling in different data points the same or different interpolation methods could be used for any given set of data points. Thus, for example, method 700 could also provide for interpolating a second data point missing from the data. In this case, method 700 also includes calculating, using a processor, a second plurality of different polynomial interpolation values for the second missing data point using a plurality of different polynomial interpolation formulas. Method 700 may also include calculating, using the processor, a second relative strength for each of the second plurality of different polynomial interpolation values, wherein second relative strengths are determined. Method 700 may also include selecting, using the processor, an additional best polynomial interpolation value based on an additional highest strength of the relative strengths, wherein a first particular polynomial interpolation formula is selected for the data point, wherein a second particular polynomial interpolation formula is selected for the second data point. Method 700 may also include substituting, using the processor, the additional best polynomial interpolation value for the second data point that is missing from the data, wherein second filled data is created. In an example, the first particular polynomial interpolation formula is different than the second particular polynomial interpolation formula. In another example, the first particular polynomial interpolation formula is the same as the second particular polynomial interpolation formula.

The illustrative embodiments described with respect to FIG. 7 may be further varied. Thus, the claimed inventions are not necessarily limited by the examples provided with respect to method 700.

Figure 8:
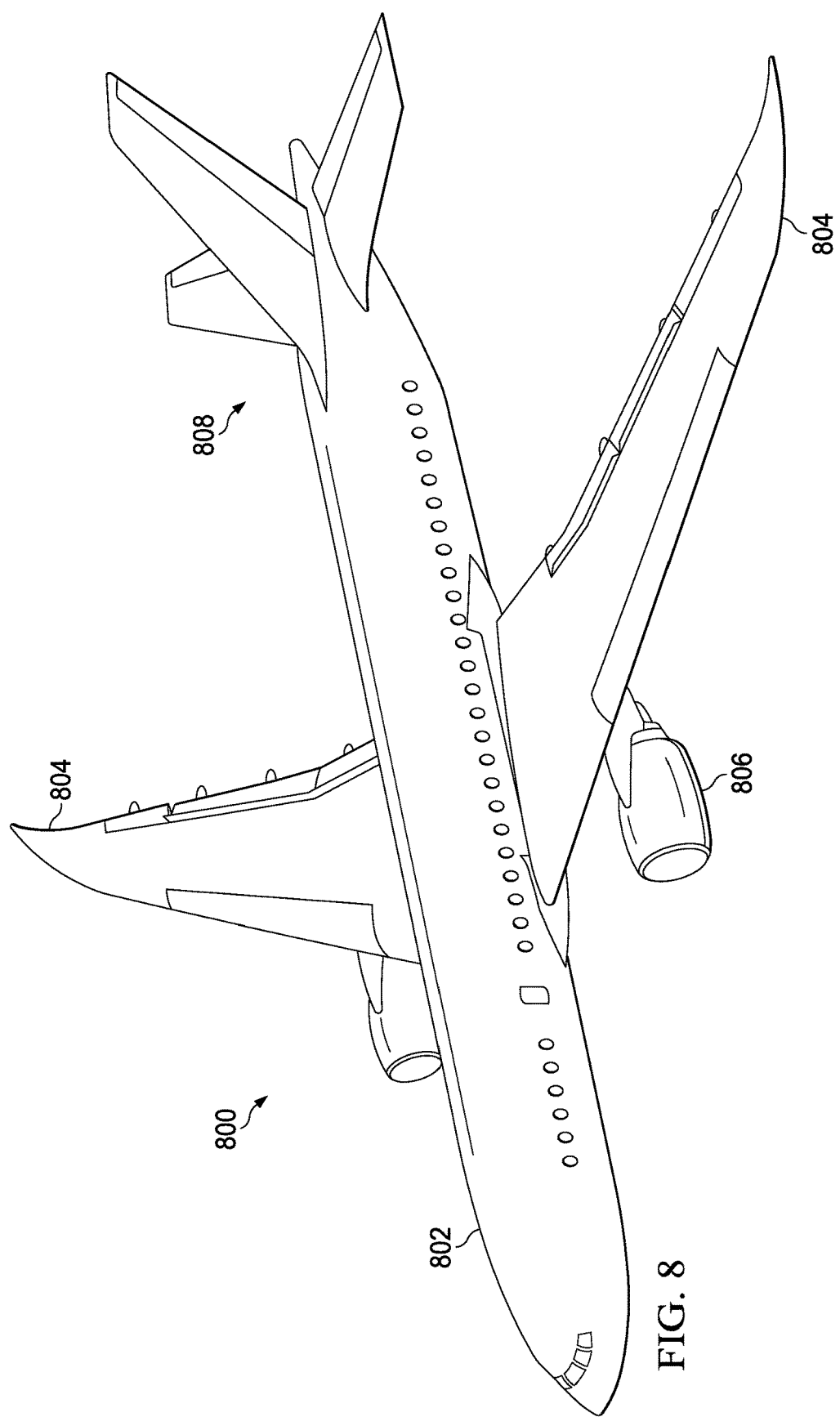
FIG. 8 is an illustration of an aircraft, in accordance with an illustrative embodiment.

FIG. 8 is an illustration of an aircraft, in accordance with an illustrative embodiment. Aircraft 800 may be an example of a platform, and may be an example of an aircraft as described with respect to FIG. 1 through FIG. 7. However, the illustrative embodiments may be used with other types of aircraft, including balloons, helicopters, gliders, flying wings, and others. The illustrative embodiments also may be used with other types of platforms, as described above.

Aircraft 800 may include fuselage 802, one or more wings such as wings 804, one or more engines such as engine 806, and tail 808. Aircraft 800 may include many other components, such as one or more components of a cabin air conditioning system.

Figure 9:
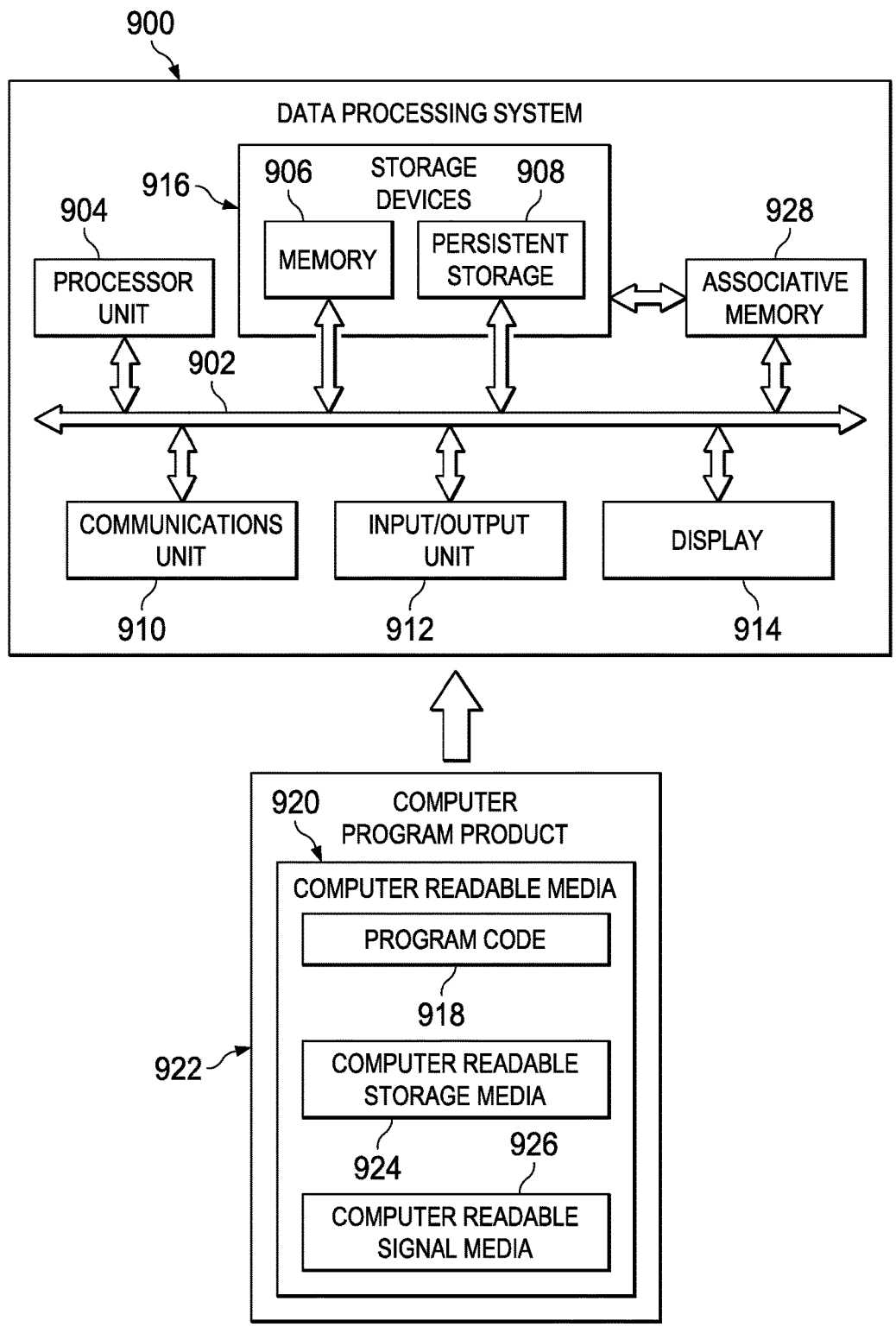
FIG. 9 illustrates a data processing system, in accordance with an illustrative embodiment.

Turning now to FIG. 9, an illustration of a data processing system is depicted in accordance with an illustrative embodiment. Data processing system 900 in FIG. 9 is an example of a data processing system that may be used to implement the illustrative embodiments, such as the interpolation methods described with respect to FIG. 1 through FIG. 8. Data processing system 900 may be used to instruct a robot to perform maintenance on an aircraft, such as aircraft 800 of FIG. 8 In this illustrative example, data processing system 900 includes communications fabric 902, which provides communications between processor unit 904, memory 906, persistent storage 908, communications unit 910, input/output (I/O) unit 912, and display 914.

Processor unit 904 serves to execute instructions for software that may be loaded into memory 906. This software may be an associative memory, content addressable memory, or software for implementing the processes described elsewhere herein. Processor unit 904 may be a number of processors, a multi-processor core, or some other type of processor, depending on the particular implementation. A number, as used herein with reference to an item, means one or more items. Further, processor unit 904 may be implemented using a number of heterogeneous processor systems in which a main processor is present with secondary processors on a single chip. As another illustrative example, processor unit 904 may be a symmetric multi-processor system containing multiple processors of the same type.

Memory 906 and persistent storage 908 are examples of storage devices 916. A storage device is any piece of hardware that is capable of storing information, such as, for example, without limitation, data, program code 918 in functional form, and/or other suitable information either on a temporary basis and/or a permanent basis. Storage devices 916 may also be referred to as computer readable storage devices in these examples. Memory 906, in these examples, may be, for example, a random access memory or any other suitable volatile or non-volatile storage device. Persistent storage 908 may take various forms, depending on the particular implementation.

For example, persistent storage 908 may contain one or more components or devices. For example, persistent storage 908 may be a hard drive, a flash memory, a rewritable optical disk, a rewritable magnetic tape, or some combination of the above. The media used by persistent storage 908 also may be removable. For example, a removable hard drive may be used for persistent storage 908.

Communications unit 910, in these examples, provides for communications with other data processing systems or devices. In these examples, communications unit 910 is a network interface card. Communications unit 910 may provide communications through the use of either or both physical and wireless communications links.

Input/output (I/O) unit 912 allows for input and output of data with other devices that may be connected to data processing system 900. For example, input/output (I/O) unit 912 may provide a connection for user input through a keyboard, a mouse, and/or some other suitable input device. Further, input/output (I/O) unit 912 may send output to a printer. Display 914 provides a mechanism to display information to a user.

Instructions for the operating system, applications, and/or programs may be located in storage devices 916, which are in communication with processor unit 904 through communications fabric 902. In these illustrative examples, the instructions are in a functional form on persistent storage 908. These instructions may be loaded into memory 906 for execution by processor unit 904. The processes of the different embodiments may be performed by processor unit 904 using computer implemented instructions, which may be located in a memory, such as memory 906.

These instructions are referred to as program code 918, computer usable program code 918, or computer readable program code 918 that may be read and executed by a processor in processor unit 904. The program code 918 in the different embodiments may be embodied on different physical or computer readable storage media, such as memory 906 or persistent storage 908.

Program code 918 is located in a functional form on computer readable media 920 that is selectively removable and may be loaded onto or transferred to data processing system 900 for execution by processor unit 904. Program code 918 and computer readable media 920 form computer program product 922 in these examples. In one example, computer readable media 920 may be computer readable storage media 924 or computer readable signal media 926. Computer readable storage media 924 may include, for example, an optical or magnetic disk that is inserted or placed into a drive or other device that is part of persistent storage 908 for transfer onto a storage device, such as a hard drive, that is part of persistent storage 908. Computer readable storage media 924 also may take the form of a persistent storage, such as a hard drive, a thumb drive, or a flash memory, that is connected to data processing system 900. In some instances, computer readable storage media 924 may not be removable from data processing system 900.

Alternatively, program code 918 may be transferred to data processing system 900 using computer readable signal media 926. Computer readable signal media 926 may be, for example, a propagated data signal containing program code 918. For example, computer readable signal media 926 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 918 may be downloaded over a network to persistent storage 908 from another device or data processing system through computer readable signal media 926 for use within data processing system 900. For instance, program code 918 stored in a computer readable storage medium in a server data processing system may be downloaded over a network from the server to data processing system 900. The data processing system providing program code 918 may be a server computer, a client computer, or some other device capable of storing and transmitting program code 918.

The different components illustrated for data processing system 900 are not meant to provide architectural limitations to the manner in which different embodiments may be implemented. The different illustrative embodiments may be implemented in a data processing system including components in addition to or in place of those illustrated for data processing system 900. Other components shown in FIG. 9 can be varied from the illustrative examples shown. The different embodiments may be implemented using any hardware device or system capable of running program code 918. As one example, the data processing system may include organic components integrated with inorganic components and/or may be comprised entirely of organic components excluding a human being. For example, a storage device may be comprised of an organic semiconductor.

In another illustrative example, processor unit 904 may take the form of a hardware unit that has circuits that are manufactured or configured for a particular use. This type of hardware may perform operations without needing program code 918 to be loaded into a memory from a storage device to be configured to perform the operations.

For example, when processor unit 904 takes the form of a hardware unit, processor unit 904 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 918 may be omitted because the processes for the different embodiments are implemented in a hardware unit.

In still another illustrative example, processor unit 904 may be implemented using a combination of processors found in computers and hardware units. Processor unit 904 may have a number of hardware units and a number of processors that are configured to run program code 918. With this depicted example, some of the processes may be implemented in the number of hardware units, while other processes may be implemented in the number of processors.

As another example, a storage device in data processing system 900 is any hardware apparatus that may store data. Memory 906, persistent storage 908, and computer readable media 920 are examples of storage devices in a tangible form.

In another example, a bus system may be used to implement communications fabric 902 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 906, or a cache, such as found in an interface and memory controller hub that may be present in communications fabric 902.

Data processing system 900 may also include associative memory 928. Associative memory 928 may be in communication with communications fabric 902. Associative memory 928 may also be in communication with, or in some illustrative embodiments, be considered part of storage devices 916. While one associative memory 928 is shown, additional associative memories may be present.

As used herein, the term "associative memory" refers to a plurality of data and a plurality of associations among the plurality of data. The plurality of data and the plurality of associations may be stored in a non-transitory computer readable storage medium. The plurality of data may be collected into associated groups. The associative memory may be configured to be queried based on at least indirect relationships among the plurality of data in addition to direct correlations among the plurality of data. Thus, an associative memory may be configured to be queried based solely on direct relationships, based solely on at least indirect relationships, as well as based on combinations of direct and at least indirect relationships. An associative memory may be a content addressable memory.

Thus, an associative memory may be characterized as a plurality of data and a plurality of associations among the plurality of data. The plurality of data may be collected into associated groups. Further, the associative memory may be configured to be queried based on at least one relationship, selected from a group that includes direct and at least indirect relationships, or from among the plurality of data in addition to direct correlations among the plurality of data. An associative memory may also take the form of software. Thus, an associative memory also may be considered a process by which information is collected into associated groups in the interest of gaining new insight based on relationships rather than direct correlation. An associative memory may also take the form of hardware, such as specialized processors or a field programmable gate array.

As used herein, the term "entity" refers to an object that has a distinct, separate existence, though such existence need not be a material existence. Thus, abstractions and legal constructs may be regarded as entities. As used herein, an entity need not be animate. Associative memories work with entities.

The different illustrative embodiments can take the form of an entirely hardware embodiment, an entirely software embodiment, or an embodiment containing both hardware and software elements. Some embodiments are implemented in software, which includes but is not limited to forms such as, for example, firmware, resident software, and microcode.

Furthermore, the different embodiments can take the form of a computer program product accessible from a computer usable or computer readable medium providing program code 918 for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or computer usable program code 918 such that when the computer readable or computer usable program code 918 is executed on a computer, the execution of this computer readable or computer usable program code 918 causes the computer to transmit another computer readable or computer usable program code 918 over a communications link. This communications link may use a medium that is, for example without limitation, physical or wireless.

A data processing system suitable for storing and/or executing computer readable or computer usable program code 918 will include one or more processors coupled directly or indirectly to memory elements through a communications fabric, such as a system bus. The memory elements may include local memory employed during actual execution of the program code 918, bulk storage, and cache memories which provide temporary storage of at least some computer readable or computer usable program code 918 to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of performing maintenance on an aircraft, the method comprising:
    programming a robot, comprising at least one of: an inspection tool, and a maintenance tool, for receiving and executing a command;
    receiving, in a processor during operation of the aircraft, from a first sensor that measures a first position of a first component located at a first part on the aircraft, a first incomplete input that comprises fluctuations of a first parameter that represents a performance of an aircraft system through a time series and comprises first blanks over the time series, such that the first blanks comprise a point in time that the processor receives, from a second sensor located at a second part of the aircraft, a second parameter for the aircraft system;
    receiving, from the second sensor during the operation of the aircraft, a second incomplete input that comprises fluctuations of the second parameter that represents the performance of the aircraft system through the time series and comprises second blanks over the time series, such that the second blanks comprise a point in time that the processor receives the first parameter from the first sensor;
    applying rules, responsive to a variation between parameters within the first incomplete input and between parameters within the second incomplete input, to the first incomplete input and the second incomplete input that self-generate a filled-in table that fills in the first blanks and the second blanks thus forming an accurate time series for the performance of the aircraft system, and thereby the rules producing, for each blank in the first blanks and for each blank in the second blanks:
        a plurality of interpolative estimates for the first parameter during the first blanks and the second parameter during the second blanks;
        using an order of interpolation, a confidence score for each interpolative estimate in the plurality of interpolative estimates; and
        using a strength of the confidence score for each interpolative estimate, a selection from the plurality of interpolative estimates that completes the filled-in table, such that the filled-in table comprises: the selection, the first parameter, and the second parameter;
    determining, using the filled-in table, a need for at least one of: an inspection, and a maintenance action on the aircraft system; and
    generating, using the need, and transmitting the command to the robot.

2. The method of claim 1, further comprising:
    calculating, using the processor using a plurality of different polynomial interpolation formulas, a plurality of different polynomial interpolation values for a missing data point in the first blanks;
    calculating, using the processor, relative strengths for each of the plurality of different polynomial interpolation values, wherein calculating a relative strength comprises, for each of the plurality of different polynomial interpolation values, comparing a given polynomial interpolation value in the plurality of different polynomial interpolation values to a previous order of polynomial for that given polynomial interpolation value;
    selecting, using the processor, a best polynomial interpolation value based on a highest strength of the relative strengths;
    substituting, using the processor, the best polynomial interpolation value for the missing data point in the first blanks, wherein filled data is created;
    determining, using the processor, a status of at least parts of the first component based on the filled data, wherein an analysis is formed; and
    responsive to the analysis indicating that maintenance is due for the first component, causing maintenance to be performed on the first component.

3. The method of claim 2, wherein:
    the plurality of different polynomial interpolation formulas are selected from the group consisting of: a linear method, a quadratic method, a cubic method, a fourth order method, a fifth order method, and combinations thereof; and
    the first blanks consist of periods of time devoid of a transmission from the first sensor and the second blanks comprise periods of time devoid of a transmission from the second sensor.

4. The method of claim 2, wherein:
    the plurality of different polynomial interpolation formulas consists of all of: a linear method, a quadratic method, a cubic method, a fourth order method, and a fifth order method; and
    the fluctuations of the first parameter that represents a performance of the aircraft system comprise a pattern of values for the first parameter that fluctuate rapidly, then remain at a constant interval for a fixed period of time, then fluctuate rapidly again.

5. The method of claim 2, wherein receiving the first incomplete input and the second incomplete input occur during operation of the aircraft and wherein remaining steps in the method are performed after the aircraft is non-operational.

6. The method of claim 2, wherein calculating the relative strength for each of the plurality of different polynomial interpolation values comprises, for a given value, using a strength formula to determine a given strength for the given value.

7. The method of claim 6, wherein the strength formula for the given value is based on 1) in a first case of a linear polynomial interpolation formula used to calculate the given value, a previous measured value for the given value or, 2) in a second case of a higher order polynomial formula used to calculate the given value, the strength formula is based on a prior value calculated using a prior polynomial interpolation formula different than a current polynomial interpolation formula used to determine the given value.

8. The method of claim 7, wherein the plurality of different polynomial interpolation formulas consist of five formulas consisting of a linear formula, a quadratic formula, a cubic formula, a fourth order formula, and a fifth order formula, and wherein the strength formula, S, is selected from the group consisting of:

for the linear formula, $$S = 1 - \text{abs}\left(\frac{\text{Linear} - \text{Previous Value}}{\text{Linear}}\right);$$

for the quadratic formula, $$S = 1 - \text{abs}\left(\frac{\text{Quadratic} - \text{Linear}}{\text{Quadratic}}\right);$$

for the cubic formula, $$S = 1 - \text{abs}\left(\frac{\text{Cubic} - \text{Quadratic}}{\text{Cubic}}\right);$$

for the fourth order formula, $$S = 1 - \text{abs}\left(\frac{\text{4th Order} - \text{Cubic}}{\text{4th Order}}\right);$$

for the fifth order formula, $$S = 1 - \text{abs}\left(\frac{\text{5th Order} - \text{4th Order}}{\text{5th Order}}\right);$$

wherein five values of S are determined.

9. The method of claim 8, wherein selecting the best polynomial interpolation value based on the highest strength of the relative strengths comprises: selecting, from the five values of S, a given value that is closest to 1.

10. The method of claim 2, wherein the first component is a trim air valve and the first sensor is a trim air valve sensor, wherein the first sensor is located in a first location of the aircraft.

11. The method of claim 1, wherein the strength of the confidence score represents a closeness of an interpolative estimate to an actual value for a respective parameter at a respective sensor during a respective blanks.

12. The method of claim 11, wherein the second part of the aircraft comprises a trim air valve and the second sensor is a trim air valve sensor, wherein the second sensor is located in a second location of the aircraft.

13. The method of claim 1 wherein the method further comprises:
calculating, using the processor, a second plurality of different polynomial interpolation values for a missing data point in the second blanks using a plurality of different polynomial interpolation formulas;
calculating, using the processor, a second relative strength for each of the second plurality of different polynomial interpolation values, wherein second relative strengths are determined;
selecting, using the processor, an additional best polynomial interpolation value based on an additional highest strength of the second relative strengths, wherein a first particular polynomial interpolation formula is selected for the missing data point in the second blanks, wherein a second particular polynomial interpolation formula is selected for the missing data point in the second blanks; and
substituting, using the processor, the additional best polynomial interpolation value for the missing data point in the second blanks, wherein second filled data is created.

14. The method of claim 13 wherein the first particular polynomial interpolation formula is different than the second particular polynomial interpolation formula.

15. The method of claim 13 wherein the first particular polynomial interpolation formula is the same as the second particular polynomial interpolation formula.

16. The method of claim 1, wherein the first part of the aircraft and the second part of the aircraft comprise, respectively, a port side of the aircraft and a starboard side of the aircraft.

17. A machine that determines a need for and executes at least one of: an inspection, and a maintenance action, on an aircraft, such that the machine comprises:
a robot that comprises at least one of: an inspection tool, and a maintenance tool, configured to receive and execute a command;
a processor;
a bus connected to the processor;
a memory connected to the bus, the memory storing computer usable program code configured to:
receive during an operation of the aircraft, from a first sensor located at a first part of the aircraft and configured to transmit a first parameter for an aircraft system, a first incomplete input that comprises fluctuations of the first parameter that represents a performance of the aircraft system through a time series and comprises first blanks over the time series, such that the first blanks comprise a point in time that the memory receives, from a second sensor located at a second part of the aircraft, a second parameter for the aircraft system;
receive, from the second sensor during the operation of the aircraft, a second incomplete input that comprises fluctuations of the second parameter that represents the performance of the aircraft system through the time series and comprises second blanks over the time series, such that the second blanks comprise a point in time that the memory receives the first parameter from the first sensor;
apply rules, responsive to a variation between parameters within the first incomplete input and between parameters within the second incomplete input, to the first incomplete input and the second incomplete input that self-generate a filled-in table that fills in the first blanks and the second blanks and comprises an accurate time series for the performance of the aircraft system, such that for each blank in the first blanks and for each blank in the second blanks, the rules produce:
interpolative estimates for the first parameter during the first blanks and the second parameter during the second blanks;
based upon an order of interpolation, a confidence score for each interpolative estimate in the plurality of interpolative estimates; and based upon a strength of the confidence score for each interpolative estimate, a selection from the plurality of interpolative estimates that completes the filled-in table, such that the filled-in table comprises: the selection, the first parameter, and the second parameter;

based upon the filled-in table, determine the need for at least one of: the inspection, and the maintenance action on the aircraft system; and based upon the need, generate and transmit the command to the robot.

18. The machine of claim 17, wherein the first blanks consist of periods of time devoid of a transmission from the first sensor and the second blanks comprise periods of time devoid of a transmission from the second sensor.

19. The machine of claim 17, wherein the fluctuations of the first parameter that represents the performance of the aircraft system comprise a pattern of values for the first parameter that fluctuate rapidly, then remain at a constant interval for a fixed period of time, then fluctuate rapidly again; and wherein the strength of the confidence score represents a closeness of an interpolative estimate to an actual value for a parameter at a respective sensor during a respective blanks.

20. The machine of claim 17, further comprising:

computer usable program code configured to receive data that measures a first position of a first component located on the aircraft, wherein the data lacks a data point necessary to complete a data set, from a first sensor;

computer usable program code configured to calculate, using the processor, a plurality of different polynomial interpolation values for the data point using, a plurality of different polynomial interpolation formulas;

computer usable program code configured to calculate, using the processor, a relative strength for each of the plurality of different polynomial interpolation values, wherein relative strengths are determined;

computer usable program code configured to select, using the processor, a best polynomial interpolation value based on a highest strength of the relative strengths;

computer usable program code for substituting, using the processor, the best polynomial interpolation value for the data point that is missing from the data, wherein filled data is created;

computer usable program code configured to determine, using the processor, a status of at least parts of the first component based on the filled data, wherein an analysis is formed;

computer usable program code configured to, responsive to the analysis indicating that maintenance is due for the first component, order the robot to perform maintenance on the first component;

wherein the computer usable program code configured to calculate the relative strengths comprises computer usable program code, for each of the plurality of different polynomial interpolation values, configured to compare a given polynomial interpolation value in the plurality of different polynomial interpolation values to a previous order of polynomial for that given polynomial interpolation value; and wherein the computer usable program code configured to receive the data during the operation of the aircraft is further configured to execute additional steps after the aircraft is non-operational, and wherein the first part of the aircraft and the second part of the aircraft comprise a port side of the aircraft and a starboard side of the aircraft.

21. A machine that determines a need for and executes at least one of: an inspection, and a maintenance action, on an air conditioning system on an aircraft, such that the machine comprises:

a robot that comprises at least one of: an inspection tool, and a maintenance tool, configured to receive and execute a command;

a processor;

a bus connected to the processor;

a memory connected to the bus, the memory storing a computer usable program code configured to:

receive during an operation of the aircraft, from a first sensor located at a first trim air valve on the aircraft and configured to transmit a position of the first trim air valve, a first incomplete input that comprises fluctuations of the position of the first trim air valve that represents a performance of the air conditioning system through a time series and comprises first blanks over the time series, such that the first blanks comprise a point in time that the memory receives, from a second sensor located at a second trim air valve on the aircraft, a position of the second trim air valve;

receive from the second sensor, during the operation of the aircraft, a second incomplete input that comprises fluctuations of the position of the second trim air valve that represents the performance of the air conditioning system through the time series and comprises second blanks over the time series, such that the second blanks comprise a point in time that the memory receives the position of the first trim air valve from the first sensor;

apply rules, responsive to a variation between parameters within the first incomplete input and between parameters within the second incomplete input, to the first incomplete input and the second incomplete input that self-generate a filled-in table that fills in the first blanks and the second blanks and comprises an accurate time series for the performance of the air conditioning system, such that for each blank in the first blanks and for each blank in the second blanks, the rules produce:

a plurality of interpolative estimates for the position of the first trim air valve during the first blanks and the position of the second trim air valve during the second blanks;

based upon an order of interpolation, a confidence score for each interpolative estimate in the plurality of interpolative estimates; and based upon a strength of the confidence score for each interpolative estimate, a selection from the plurality of interpolative estimates that completes the filled-in table, such that the filled-in table comprises: the selection, the position of the first trim air valve, and the position of the second trim air valve;

based upon the filled-in table, determine the need for at least one of: the inspection, and the maintenance action on the air conditioning system; and based upon the need, generate and transmit the command to the robot.

22. The machine of claim 21, further comprising the processor configured to process big data.

23. The machine of claim 21 wherein a binary signal represents the position of the first trim air valve.

24. The machine of claim 21, wherein the fluctuations comprise rapid fluctuations between variable and constant values.

25. A method of performing maintenance on an aircraft, the method comprising:
a processor determining a need for and executing at least one of: an inspection, and a maintenance action, on an air conditioning system on the aircraft;
programming a robot, comprising at least one of: an inspection tool, and a maintenance tool, for receiving and executing a command;
receiving, during an operation of the aircraft, from a first sensor located at a first trim air valve on the aircraft and configured to transmit a position of the first trim air valve, a first incomplete input that comprises fluctuations of the position of the first trim air valve that represents a performance of the air conditioning system through a time series and comprises first blanks over the time series, such that the first blanks comprise a point in time that the processor receives, from a second sensor located at a second trim air valve on the aircraft, a position of the second trim air valve;
receiving from the second sensor, during the operation of the aircraft, a second incomplete input that comprises fluctuations of the position of the second trim air valve that represents the performance of the air conditioning system through the time series and comprises second blanks over the time series, such that the second blanks comprise a point in time that the processor receives the position of the first trim air valve from the first sensor;
applying rules, responsive to a variation between parameters within the first incomplete input and between parameters within the second incomplete input, to the first incomplete input and the second incomplete input that self-generate a filled-in table that fills in the first blanks and the second blanks and comprises an accurate time series for the performance of the air conditioning system, such that for each blank in the first blanks and for each blank in the second blanks, the rules produce:
a plurality of interpolative estimates for the position of the first trim air valve during the first blanks and the position of the second trim air valve during the second blanks;
using an order of interpolation, a confidence score for each interpolative estimate in the plurality of interpolative estimates; and
using a strength of the confidence score for each interpolative estimate, a selection from the plurality of interpolative estimates that completes the filled-in table, such that the filled-in table comprises: the selection, the position of the first trim air valve, and the position of the second trim air valve;
determining, using the filled-in table the need for at least one of: the inspection, and the maintenance action on the air conditioning system; and
generating, using the need, and transmitting the command to the robot.

26. The method of claim 25, further comprising:
calculating, using the processor and a plurality of different polynomial interpolation formulas, a plurality of different polynomial interpolation values for the first blanks and the second blanks;
calculating, using the processor, a relative strength for each of the plurality of different polynomial interpolation values, wherein relative strengths are determined via comparing a given polynomial interpolation value in the plurality of different polynomial interpolation values to a previous order of polynomial for that given polynomial interpolation value;
selecting, using the processor, a best polynomial interpolation value based on a highest strength of the relative strengths;
substituting, using the processor, the best polynomial interpolation value for the first blanks and the second blanks.

27. The method of claim 26, wherein the plurality of different polynomial interpolation formulas are selected from the group consisting of: a linear method, a quadratic method, a cubic method, a fourth order method, a fifth order method, and combinations thereof.

28. The method of claim 26, wherein the plurality of different polynomial interpolation formulas consists of all of: a linear method, a quadratic method, a cubic method, a fourth order method, and a fifth order method.

29. The method of claim 26, wherein calculating the relative strength for each of the plurality of different polynomial interpolation values comprises, for a given value, using a strength formula to determine a given strength for the given value.

30. The method of claim 29, wherein the strength formula for a given value is based on 1) in a first case of a linear polynomial interpolation formula used to calculate the given value, a previous measured value for the given value or, 2) in a second case of a higher order polynomial formula used to calculate the given value, the strength formula is based on a prior value calculated using a prior polynomial interpolation formula different than a current polynomial interpolation formula used to determine the given value.

31. The method of claim 30, wherein the plurality of different polynomial interpolation formulas consist of five formulas consisting of a linear formula, a quadratic formula, a cubic formula, a fourth order formula, and a fifth order formula, and wherein the strength formula, S, is selected from the group consisting of:
for the linear formula, $$S = 1 - \text{abs}\left(\frac{\text{Linear} - \text{Previous Value}}{\text{Linear}}\right);$$

for the quadratic formula, $$S = 1 - \text{abs}\left(\frac{\text{Quadratic} - \text{Linear}}{\text{Quadratic}}\right);$$

for the cubic formula, $$S = 1 - \text{abs}\left(\frac{\text{Cubic} - \text{Quadratic}}{\text{Cubic}}\right);$$

for the fourth order formula, $$S = 1 - \text{abs}\left(\frac{\text{4th Order} - \text{Cubic}}{\text{4th Order}}\right);$$

for the fifth order formula, $$S = 1 - \text{abs}\left(\frac{5\text{th Order} - 4\text{th Order}}{5\text{th Order}}\right);$$

wherein five values of S are determined.

32. The method of claim 31, wherein selecting the best polynomial interpolation value based on the highest strength of the relative strengths comprises: selecting, from the five values of S, a given value that is closest to 1.

33. The method of claim 26, further comprising comparing cabin temperatures in different passenger zones.

34. The method of claim 25, wherein the second sensor measures a second temperature in the aircraft at a different physical area of the aircraft than the first sensor, and wherein the first blanks comprise a missing measurement from the first sensor that had not taken a first reading at a point of time when the second sensor took a second reading.

35. The method of claim 34, wherein receiving the first incomplete input and the second incomplete input occur during operation of the aircraft and wherein remaining steps in the method are performed after the aircraft is non-operational.

36. The method of claim 34, further comprising;
the first trim air valve located on a port side of the aircraft; and
the second trim air valve located on a starboard side of the aircraft.

37. The method of claim 34, wherein the second sensor is a temperature sensor and is located in a second location of the aircraft.

38. The method of claim 25, wherein the method further comprises:
calculating, using the processor, a second plurality of different polynomial interpolation values for the second blanks using a plurality of different polynomial interpolation formulas;
calculating, using the processor, a second relative strength for each of the second plurality of different polynomial interpolation values, wherein second relative strengths are determined;
selecting, using the processor, an additional best polynomial interpolation value based on an additional highest strength of the second relative strengths, wherein a first particular polynomial interpolation formula is selected for a data point in the second blanks, wherein a second particular polynomial interpolation formula is selected for the data point in the second blanks; and
substituting, using the processor, the additional best polynomial interpolation value for the data point in the second blanks, wherein second filled data is created.

39. The method of claim 38 wherein the first particular polynomial interpolation formula is different than the second particular polynomial interpolation formula.

40. The method of claim 38 wherein the first particular polynomial interpolation formula is the same as the second particular polynomial interpolation formula.

41. The method of claim 25, wherein the first sensor is a temperature sensor and is located in a first location of the aircraft.

* * * * *